United States Patent
Cho et al.

(10) Patent No.: US 8,885,064 B1
(45) Date of Patent: Nov. 11, 2014

(54) PORTABLE DEVICE AND CONTROL METHOD THEREOF WITH TEMPORARY STANDBY MODE AND TEMPORARY CAMERA MODE

(71) Applicant: LG Electronics Inc., Seoul (KR)

(72) Inventors: Eunhyung Cho, Seoul (KR); Jungbin Yim, Seoul (KR); Jiho Choi, Seoul (KR)

(73) Assignee: LG Electronic Inc., Seoul (KR)

( * ) Notice: Subject to any disclaimer, the term of this patent is extended or adjusted under 35 U.S.C. 154(b) by 0 days.

(21) Appl. No.: 14/258,632

(22) Filed: Apr. 22, 2014

(30) Foreign Application Priority Data

Feb. 17, 2014 (KR) .................. 10-2014-0017688

(51) Int. Cl.
*H04N 5/76* (2006.01)
*H04N 5/232* (2006.01)
*H04N 5/247* (2006.01)
*H04N 5/225* (2006.01)

(52) U.S. Cl.
CPC ............... *H04N 5/232* (2013.01); *H04N 5/247* (2013.01); *H04N 5/2252* (2013.01)
USPC .................................................... 348/231.2

(58) Field of Classification Search
CPC ........ H04N 5/772; H04N 5/907; H04N 5/232
USPC ............ 348/231.2, 231.6, 231.99, 222.1, 372
See application file for complete search history.

(56) References Cited

U.S. PATENT DOCUMENTS

| | | | |
|---|---|---|---|
| 7,657,568 B2 * | 2/2010 | Shimosato | 348/231.2 |
| 8,004,593 B2 * | 8/2011 | Kusaka | 348/333.02 |
| 8,723,973 B2 * | 5/2014 | Hada | 348/211.2 |
| 2007/0195371 A1 * | 8/2007 | Shimosato | 358/1.18 |
| 2011/0074964 A1 * | 3/2011 | Hada | 348/211.2 |
| 2012/0009896 A1 | 1/2012 | Bandyopadhyay et al. | |
| 2012/0038792 A1 * | 2/2012 | Nakase et al. | 348/231.2 |
| 2012/0140085 A1 | 6/2012 | Gallinat et al. | |

* cited by examiner

*Primary Examiner* — Nicholas Giles
(74) *Attorney, Agent, or Firm* — Birch, Stewart, Kolasch & Birch, LLP (57) ABSTRACT

Disclosed is a control method of a portable device, including activating a normal camera mode of a camera application, activating a normal standby mode upon detecting a normal lock event in the normal camera mode, activating a temporary standby mode upon detecting a temporary lock event in the normal camera mode, and releasing the temporary standby mode and activating the temporary camera mode upon detecting a first temporary unlock event in the temporary standby mode. In this case, a first image captured in the normal camera mode is stored in a first folder and a second image captured in the temporary camera mode is stored in a second folder. The first folder and the second folder are different folders.

20 Claims, 8 Drawing Sheets

Front side​ ​ ​ ​ ​ ​ ​ ​ ​ ​ Rear side

PORTABLE DEVICE AND CONTROL METHOD THEREOF WITH TEMPORARY STANDBY MODE AND TEMPORARY CAMERA MODE

This application claims the benefit of Korean Patent Application No. 10-2014-0017688, filed on Feb. 17, 2014, which is hereby incorporated by reference as if fully set forth herein.

BACKGROUND OF THE INVENTION

1. Field of the Invention

The present specification relates to a portable device, and more particularly to a portable device for execution of a camera application and a control method thereof.

2. Discussion of the Related Art

With advances in technology, portable devices are being altered into smart devices that provide a user with various functions. For example, portable devices are also utilized as devices to capture a surrounding image by executing a camera application.

Recent portable devices, by extension, have provided a temporary camera mode of a camera application, i.e. a guest mode, to allow others to execute a camera application installed in a portable device of a user to capture an image.

However, conventional portable devices providing a temporary camera mode require several operations to activate a temporary camera mode of a camera application in a state in which a normal camera mode of the camera application has been activated.

SUMMARY OF THE INVENTION

Accordingly, the present specification is directed to a portable device and a control method thereof that substantially obviate one or more problems due to limitations and disadvantages of the related art.

An object of the present specification is to provide a portable device to ensure easy activation of a temporary standby mode of a camera application therein and a control method of the portable device.

Additional advantages, objects, and features of the specification will be set forth in part in the description which follows and in part will become apparent to those having ordinary skill in the art upon examination of the following or may be learned from practice of the present specification. The objectives and other advantages of the present specification may be realized and attained by the structure particularly pointed out in the written description and claims hereof as well as the appended drawings.

To achieve these objects and other advantages and in accordance with the purpose of the present specification, as embodied and broadly described herein, a portable device includes a camera unit configured to sense a surrounding image of the portable device, a sensor unit configured to sense at least one of surrounding environment of the portable device and a user input, a display unit configured to display an execution screen of a camera application, the camera application providing a normal camera mode and a temporary camera mode, and a processor configured to control the camera unit, the sensor unit, and the display unit, wherein the processor is further configured to activate the normal camera mode of the camera application, wherein a first image captured in the normal camera mode is stored in a first folder, activate a normal standby mode of the portable device when a normal lock event is detected in the normal camera mode, activate a temporary standby mode of the portable device when a temporary lock event is detected in the normal camera mode, and when a first temporary unlock event is detected in the temporary standby mode, release the temporary standby mode and activate the temporary camera mode, wherein a second image captured in the temporary camera mode is stored in a second folder, and wherein the second folder is different from the first folder.

In accordance with another embodiment of the present specification, a control method of a portable device, includes activating a normal camera mode of a camera application, wherein a first image captured in the normal camera mode is stored in a first folder, activating a normal standby mode of the portable device when a normal lock event is detected in the normal camera mode, activating a temporary standby mode of the portable device when a temporary lock event is detected in the normal camera mode, and when a first temporary unlock event is detected in the temporary camera mode of the camera application, releasing the temporary standby mode and activating the temporary camera mode, wherein a second image captured in the temporary camera mode is stored in a second folder, and wherein the second folder is different from the first folder.

It is to be understood that both the foregoing general description and the following detailed description of the present specification are exemplary and explanatory and are intended to provide further explanation of the present specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings.

DETAILED DESCRIPTION OF THE INVENTION

Hereinafter, various embodiments will be described in detail with reference to the attached drawings and illustrations thereof, but it should be understood that the present specification is not restricted or limited by the embodiments that will be described hereinafter.

Although the terms used in the following description are selected, as much as possible, from general terms that are widely used at present while taking into consideration the functions obtained in accordance with the present specification, these terms may be replaced by other terms based on intensions of those skilled in the art, customs, emergence of new technologies, or the like. Also, in a particular case, terms that are arbitrarily selected by the applicant of the present specification may be used. In this case, the meanings of these terms may be described in corresponding description parts of the specification. Accordingly, it should be noted that the terms used herein should be construed based on practical meanings thereof and the whole content of this specification, rather than being simply construed based on names of the terms.

In the present specification, a portable device may mean a portable digital device having an image capture function. For example, the portable device may be a smart phone, a smart pad, a tablet computer, a digital camera, a head mounted display, a laptop computer, a music player, or a foldable display device.

In the present specification, the portable device may provide a normal standby mode and a temporary standby mode. The normal standby mode of the portable device may be a power saving mode, and the portable device may be normally kept in the normal standby status. The portable device in the normal standby mode may activate a function to release the normal standby mode, and may inactivate at least one function of the portable device. For example, the portable device in the normal standby mode may activate a power button function and a home button function to release the normal standby mode, and may inactivate a display unit and a camera unit. Thereby, the portable device may reduce consumption of standby power. This will be described below in detail with reference to FIG. 3.

Figure 4A:
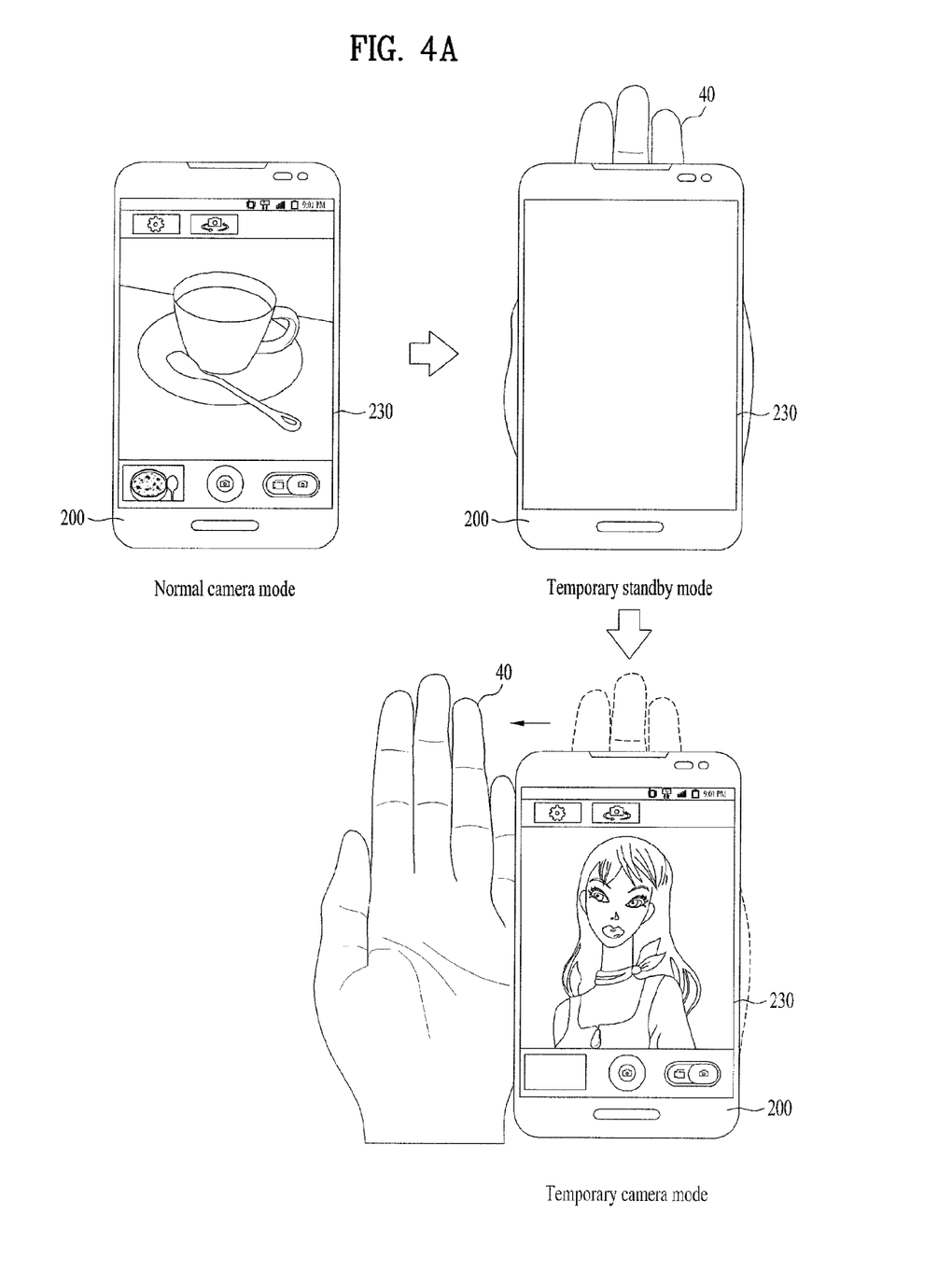
FIG. 4A shows a method of activating a temporary camera mode of a camera application by the portable device in accordance with one embodiment of the present specification.
Figure 4B:
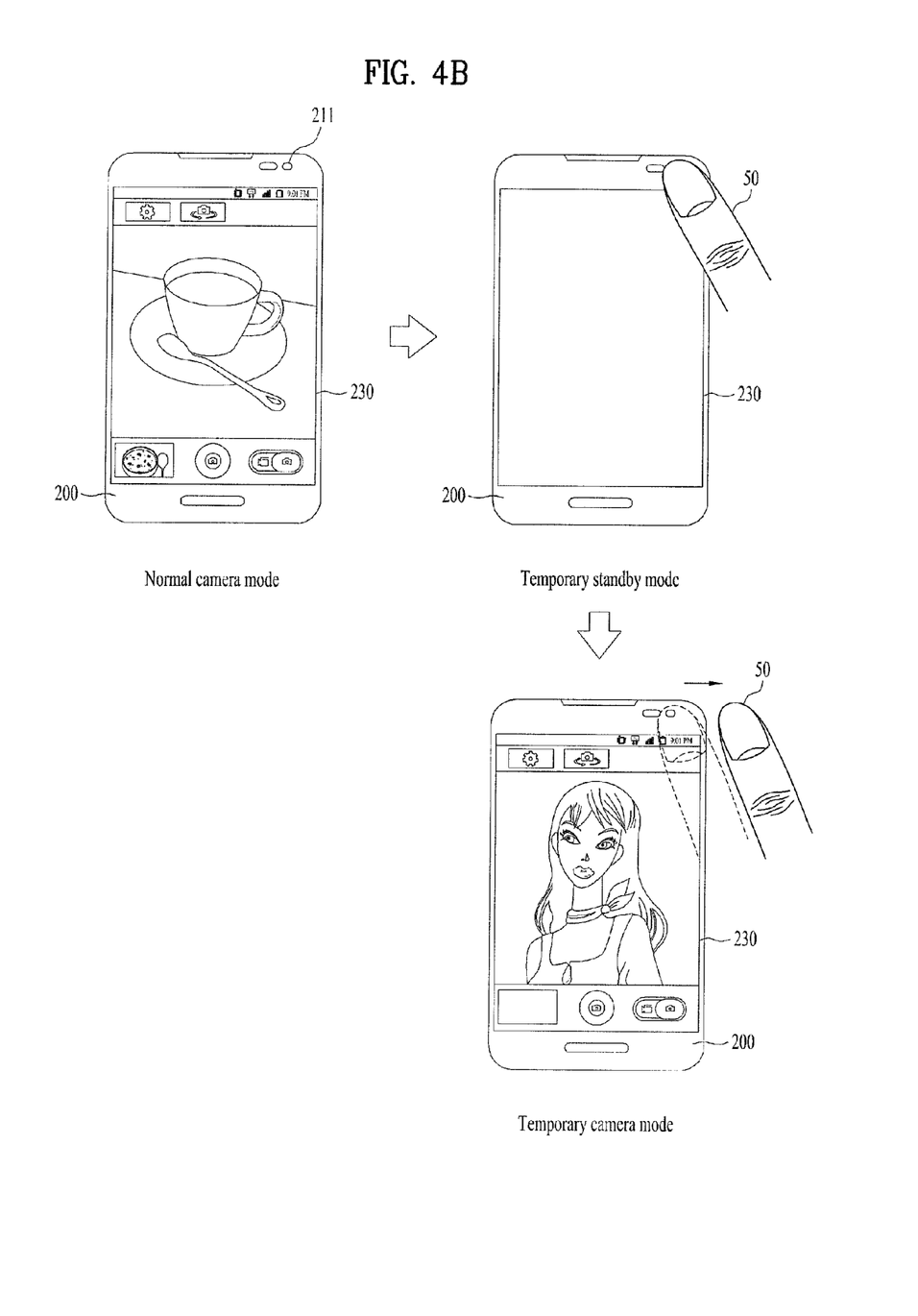
FIG. 4B shows a method of activating a temporary camera mode of a camera application by the portable device in accordance with another embodiment of the present specification.

The temporary standby mode of the portable device may be a power saving mode, and the portable device may be temporarily kept in the temporary standby status for activation of a temporary camera mode of a camera application. The portable device in the temporary standby mode may further activate a function to release the temporary standby mode as well as the function activated by the portable device in the normal standby mode, and may inactivate at least one function of the portable device. For example, in addition to the power button function and the home button function, the portable device in the temporary standby mode may further activate at least one of a camera unit and a sensor unit to release the temporary standby mode, and may inactivate a display unit. Thereby, the portable device may reduce consumption of standby power and may be kept so as to enter a temporary camera mode. In addition, in the case in which the portable device in accordance with one embodiment of the present specification is a device having a call reception function and a message reception function, the portable device may activate the call reception function and the message reception function in the normal standby mode and in the temporary standby mode. This will be described below in detail with reference to FIG. 4.

In the present specification, a camera application of the portable device may provide a normal camera mode and a temporary camera mode. The normal camera mode of the camera application may mean a mode that is normally activated upon execution of the camera application. That is, the normal camera mode may be a normal mode of the camera application. In accordance with one embodiment of the present specification, the normal camera mode may be activated when the camera application is executed upon detection of a user input to a camera icon displayed on a home screen, or a quick camera icon displayed on a lock screen.

The temporary camera mode of the camera application may mean a mode that is temporarily activated upon execution of the camera application simultaneously with release of the temporary standby mode. In this case, the temporary camera mode may be a guest mode of the camera application. In accordance with one embodiment of the present specification, the temporary camera mode may be activated when the camera application is executed as the temporary standby mode is released upon detection of an event to release the temporary standby mode. That is, in accordance with one embodiment of the present specification, entering the normal camera mode is possible through a home screen and the like, whereas entering the temporary camera mode is possible only through the temporary standby mode.

The portable device may store a first image captured in the normal camera mode and a second image captured in the temporary camera mode in different folders. The normal camera mode and the temporary camera mode of the camera application will be described below in detail with reference to FIGS. 3 to 5.

Figure 1:
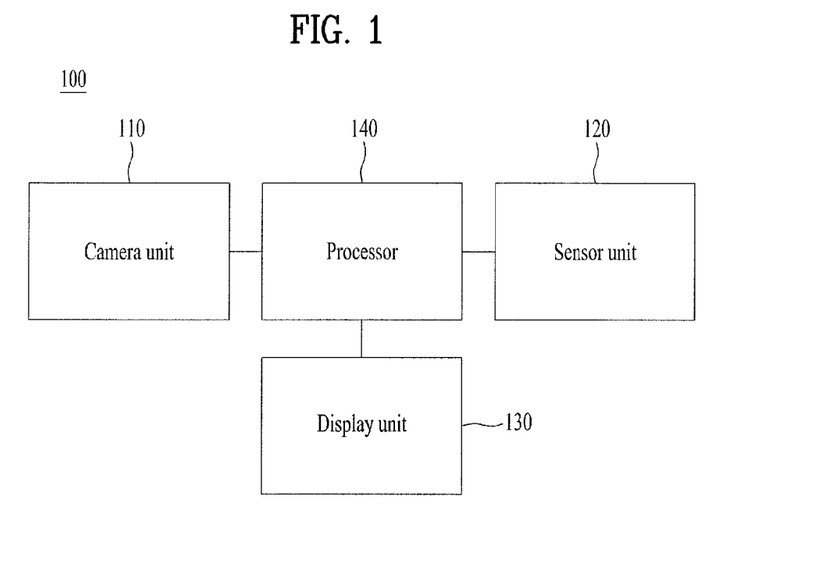
FIG. 1 is a view showing a configuration of a portable device in accordance with one embodiment of the present specification.

FIG. 1 is a view showing a configuration of a portable device in accordance with one embodiment of the present specification.

Referring to FIG. 1, the portable device 100 may include a camera unit 110, a sensor unit 120, a display unit 130, and a processor 140.

The camera unit 110 may sense an image within a view angle range. In the present specification, the camera unit 110 may sense a surrounding image of the portable device 100, and transmit the sensed result to the processor 140. The camera unit 110 may be activated upon execution of a camera application. In addition, the camera unit 110 may be activated even in a temporary standby mode.

The sensor unit 120 may sense at least one of a surrounding environment of the portable device 100 and a user input. The sensor unit 120 may sense at least one of a surrounding environment of the portable device 100 and a user input using at least one sensing means included in the device, and transmit the sensed result to the processor 140. The sensor unit 120 may be activated upon activation of the display unit 130. In addition, some functions of the sensor unit 120 may be activated even in a normal standby mode or in a temporary standby mode in which the display unit 130 is inactivated.

The at least one sensing means may include a gravity sensor, a motion sensor, a gyro sensor, an accelerometer, an infrared sensor, an inclination sensor, a bending sensor, an audio sensor, a video sensor, an image sensor, a Global Positioning System (GPS) sensor, a touch sensor, and the like. The aforementioned sensors may be included as separate elements in the portable device 100, or may be integrated into at least one element and be included in the portable device 100.

The display unit 130 may display visual information. In the present specification, the display unit 130 may display an execution screen of a camera application. In addition, the display unit 130 may display a lock screen or a home screen. The display unit 130 may be inactivated in a normal standby mode or in a temporary standby mode, and may be activated upon release of the normal standby mode or the temporary standby mode.

According to embodiments, the display unit 130 may include at least one of a Light Emitting Diode (LED) display, an Organic Light Emitting Diode (OLED) display, a Liquid Crystal Display (LCD), an electronic ink display, and a flexible display. The display unit 130 may include a touch sensitive display unit 130, and may detect a user input as a touch on the display unit 130.

The processor 140 may control at least one unit included in the portable device 100. More particularly, the processor 140 may control the aforementioned respective units, and may control data transmission and/or reception between the respective units.

In the present specification, the processor 140 may activate a normal camera mode of a camera application. In this case, the processor 140 may store a first image, captured in a normal camera mode, in a first folder. Here, the first folder may be a normal picture folder.

In addition, the processor 140 may detect a normal lock event to activate a normal standby mode of the portable device 100. When the normal lock event is detected in a normal camera mode, the processor 140 may activate the normal standby mode.

In addition, the processor 140 may detect a temporary lock event to activate a temporary standby mode of the portable device 100. In this case, the processor 140 may activate at least one of the camera unit 110 and the sensor unit 120 in a normal camera mode, and detect a temporary lock event using at least one of the activated the camera unit 110 and the sensor unit 120. When a temporary lock event is detected in a normal camera mode, the processor 140 may activate a temporary standby mode.

In addition, the processor 140 in a temporary standby mode may detect a first temporary unlock event to release the temporary standby mode and to activate a temporary camera mode of a camera application. In this case, the processor 140 may activate at least one of the camera unit 110 and the sensor unit 120 even in a temporary standby mode, and detect a first temporary unlock event using at least one of the activated camera unit 110 and the sensor unit 120. When a first temporary unlock event is detected in a temporary standby mode, the processor 140 may release the temporary standby mode, and activate a temporary camera mode. In this case, the processor 140 may store a second image captured in the temporary camera mode in a second folder. Here, the second folder may be a temporary picture folder. That is, the processor 140 may store an image captured in a temporary camera mode and an image captured in a normal camera mode in different folders.

The above described operations of the processor 140 will be described below in detail with reference to the respective drawings. Hereinafter, as needed, the processor 140 will be described as controlling the portable device 100 or at least one unit included in the portable device 100, and the processor 140 and the portable device 100 will be described as being equal to each other.

FIG. 1 is a block diagram in accordance with one embodiment. In FIG. 1, separately shown blocks represent logically separated elements of the portable device 100. Thus, the elements of the portable device 100 as described above may be mounted as one chip or a plurality of chips according to design of the portable device 100.

Figure 2:
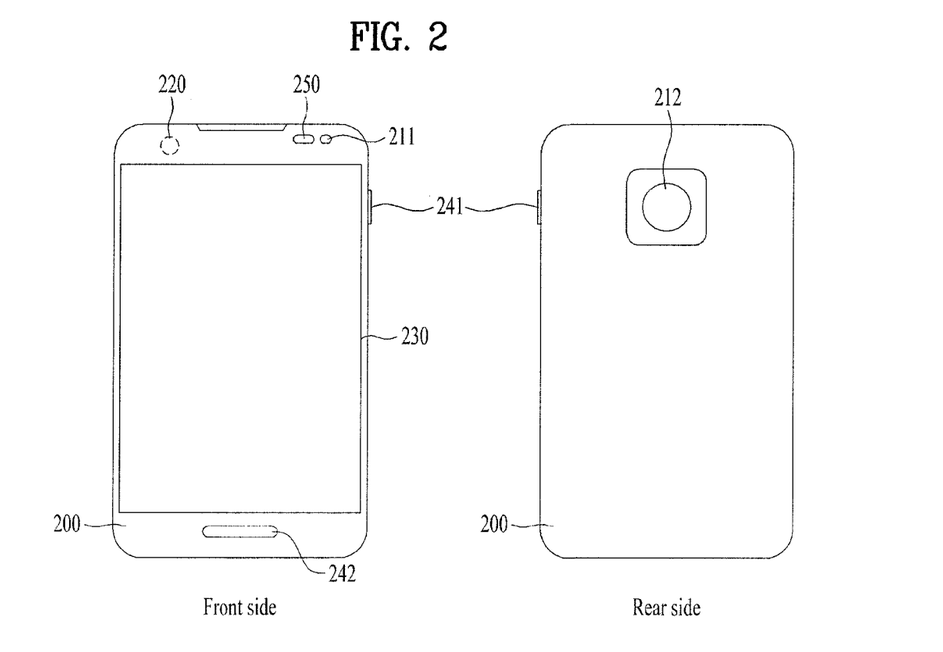
FIG. 2 is a view showing a portable device in accordance with one embodiment of the present specification.

FIG. 2 is a view showing a portable device in accordance with one embodiment of the present specification. More specifically, FIG. 2 is a view showing a smart phone as one example of a portable device. In FIG. 2, a description related to similar or the same parts as the above description of FIG. 1 will be omitted below.

As exemplarily shown in the left of FIG. 2, a portable device 200 may be provided, at a front face thereof, with a front camera unit 211, a sensor unit 220, a display unit 230, a home button 242, and a lighting unit 250. In addition, the portable device 200 may be provided at a side face thereof with a power button 241.

In the present specification, the front camera unit 211 may sense a surrounding image located in a front direction of the portable device 200, the sensor unit 220 may sense at least one of a surrounding environment and a user input of the portable device 200, and the display unit 230 may display an execution screen of a camera application, a lock screen, or a home screen.

In addition, in the present specification, the power button 241 and the home button 242 may be used as a control input to activate or inactivate the portable device 200. In the present specification, the lighting unit 250 is optional. The lighting unit 250 may inform a user of occurrence of a call reception event or a message reception event in an inactivated state of the display unit 230, and may inform the user of a temporary standby mode of the portable device 200 being activated.

As exemplarily shown in the right of FIG. 2, the portable device 200 may be provided at a rear face thereof with a rear camera unit 212. The rear camera unit 212 may sense a surrounding image located in a rear direction of the portable device 200.

Although embodiments in which a portable device is a smart phone will be described hereinafter, the following description may be equally or similarly applied even to the case in which a portable device is a digital camera, for example.

Figure 3:
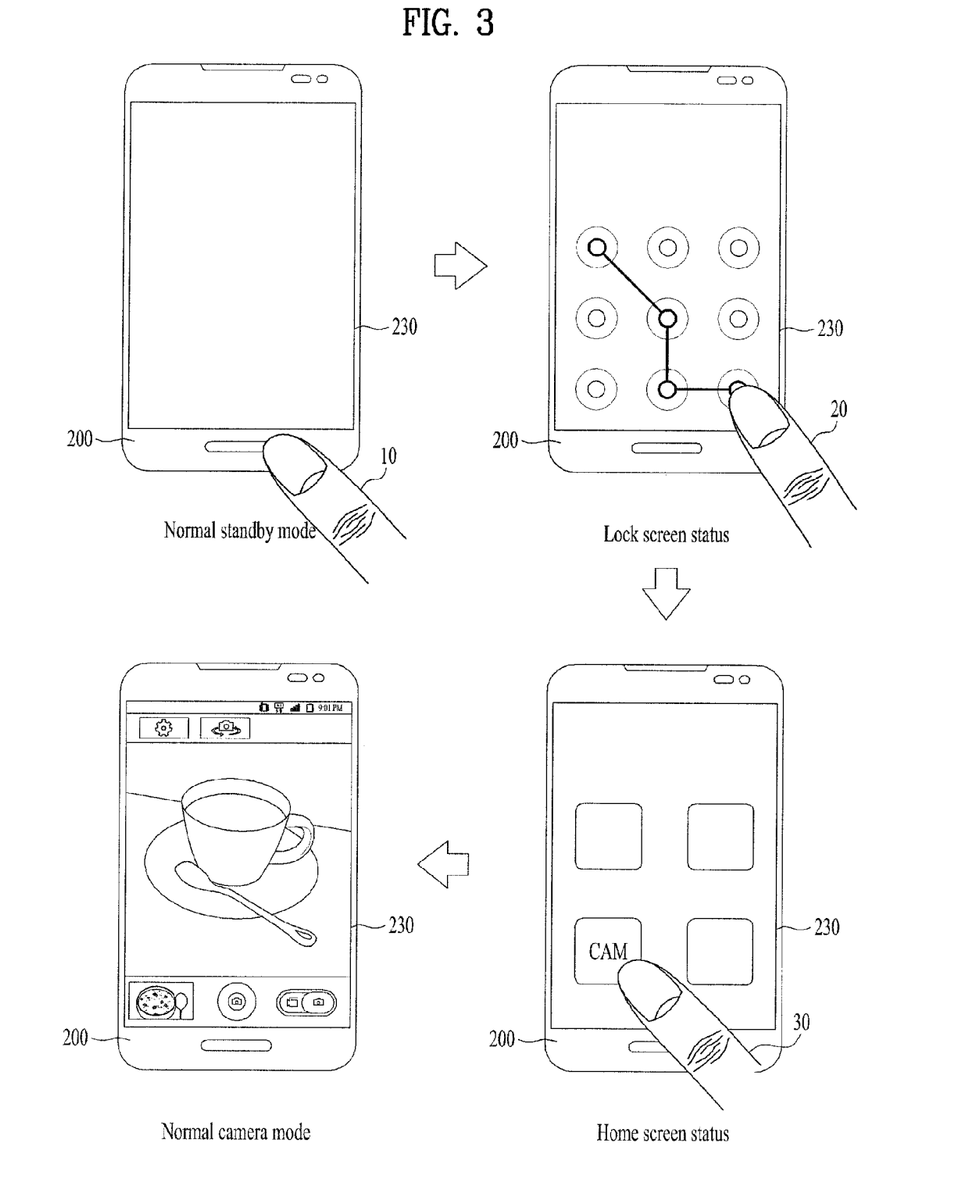
FIG. 3 shows a method of activating a normal camera mode of a camera application by the portable device in accordance with one embodiment of the present specification.

FIG. 3 shows a method of activating a normal camera mode of a camera application by the portable device in accordance with one embodiment of the present specification.

As exemplarily shown at the left upper end of FIG. 3, the portable device 200 in a normal standby mode may inactivate the display unit 230 and a camera unit. In addition, the portable device 200 in the normal standby mode may detect a normal unlock event. More particularly, the portable device 200 may continuously activate a function to detect a normal unlock event even in a normal standby mode, and may detect a normal unlock event using the activated function.

Here, the normal unlock event may mean an event to release a normal standby mode and to activate the portable device 200. For example, the normal unlock event may be at least one of a power button press event, a power button release event, a home button press event, and a home button release event. Naturally, the aforementioned events are given as one embodiment of the normal unlock event, and the portable device 200 of the present specification is not limited by the embodiment.

In summary, the portable device 200 may continuously activate a power button function and a home button function even in a normal standby mode. Upon detection of an event to press or release a power button or a home button, detection of a normal unlock event may be determined. In addition, the portable device 200 may release a normal standby mode upon detection of a normal unlock event.

As exemplarily shown at the right upper end of FIG. 3, the portable device 200, released from the normal standby mode, may activate the display unit 230, and display a lock screen. Here, the lock screen may be a screen that requires an additional user input before a home screen is displayed, in order to prevent unintentional operation of the portable device 200 or for security purposes. In addition, the portable device 200 under a lock screen status may display an unlock user interface on the lock screen based on security settings.

When the portable device 200 has no security settings, the portable device 200 under a lock screen status may detect a first user input to unlock the lock screen. For example, when the portable device 200 has no security settings, the portable device 200 under a lock screen status may activate a touch sensor unit, and detect a first user input using the activated touch sensor unit. The portable device 200 may unlock the lock screen upon detection of the first user input under the lock screen status.

When the portable device 200 has security settings, the portable device 200 under a lock screen status may detect a second user input 20 to unlock the lock screen by implementing user authentication corresponding to an unlock user interface. For example, as exemplarily shown at the right upper end of FIG. 3, when the portable device 200 has security settings, the portable device 200 under a lock screen status may display an unlock user interface in the form of a pattern, and detect the second user input 20 coinciding with a predetermined code pattern by activating a touch sensor unit. The portable device 200 may unlock the lock screen by successfully implementing user authentication upon detection of the second user input 20 under the lock screen status.

In addition, the portable device 200 may display a quick camera icon on a lock screen. When the portable device 200 under a lock screen status detects a user input to select a quick camera icon, the portable device 200 may unlock the lock screen, and directly activate a normal camera mode of a camera application.

As exemplarily shown at the right lower end of FIG. 3, the portable device 200, unlocked from the lock screen, may display a home screen on the display unit 230. Naturally, based on settings, the portable device 200 may directly display a home screen upon release of a normal standby mode without displaying a lock screen. Here, the home screen may be a screen that displays icons corresponding to applications installed in the portable device 200. For example, the home screen may be a screen that displays a camera icon, a message icon, and the like.

When the portable device 200 under a home screen status detects a user input 30 to select a displayed icon, the portable device 200 may execute an application corresponding to the selected icon. For example, as exemplarily shown at the right lower end of FIG. 3, when the user input 30 to select a camera icon displayed on a home screen is detected, the portable device 200 may execute a camera application corresponding to the selected camera icon, and activate a normal camera mode of the camera application. Here, the camera application may mean an application having an image capture function.

As exemplarily shown at the left lower end of FIG. 3, the portable device 200 in a normal camera mode may display an execution screen of the normal camera mode on the display unit 230. In addition, the portable device 200 in the normal camera mode may store a captured first image in a first folder. Here, the first folder may be a normal picture folder.

Although FIG. 3 shows only the case in which a normal camera mode of a camera application is activated as a camera icon displayed on a home screen is selected to execute the camera application, as described above, the normal camera mode may be activated even when a quick camera icon displayed on a lock screen is selected, or when a mechanical camera button is pressed or released to execute the camera application.

FIG. 4A shows a method of activating a temporary camera mode of a camera application by the portable device in accordance with one embodiment of the present specification. FIG. 4B shows a method of activating a temporary camera mode of a camera application by the portable device in accordance with another embodiment of the present specification.

Referring to the left upper end of FIGS. 4A and 4B, the portable device 200 in a normal camera mode may display an execution screen of the normal camera mode on the display unit 230. In addition, the portable device 200 may detect a normal lock event or a temporary lock event in the normal camera mode.

Here, the normal lock event may mean an event to activate a normal standby mode of the portable device 200. For example, the normal lock event may be a power button press event or a power button release event. Naturally, the aforementioned events are given as one embodiment of the normal lock event, and the portable device 200 of the present specification is not limited by the embodiment.

Here, the temporary lock event may mean an event to activate a temporary standby mode of the portable device 200.

In accordance with one embodiment of the present specification, a temporary lock event may be an event to block light to an activated camera unit. For example, as exemplarily shown at the right upper end of FIG. 4A, when a rear camera unit is activated, a temporary lock event may be an event to block light to the rear camera unit by, e.g., the user hand 40. In another example, as exemplarily shown at the right upper end of FIG. 4B, when a front camera unit is activated, a temporary lock event may be an event to block light to the front camera unit by, e.g., the user finger 50.

The portable device 200 may detect a temporary lock event based on results sensed by an activated camera unit. For example, the portable device 200 in a normal camera mode may detect a temporary lock event based on the illuminance of light sensed by an activated camera unit. More particularly, the portable device 200 in a normal camera mode may determine that a temporary lock event is detected when the illuminance of light sensed by an activated camera unit is kept below a predetermined illuminance for a first time, and may determine that a temporary lock event is not detected when the illuminance of light is not kept below the predetermined illuminance. That is, when light to an activated camera unit is blocked for a specific time in a normal camera mode, the portable device 200 may determine that a temporary lock event is detected. Here, the first time and the predetermined illuminance may be set by the user, or may be set upon the fabrication of the portable device 200.

In accordance with another embodiment of the present specification, a temporary lock event may be an event to keep a distance between the portable device 200 and a surrounding object below a predetermined distance. The portable device 200 in a normal camera mode may further activate a sensor unit (e.g., a proximity sensor unit). The portable device 200 in a normal camera mode may detect a temporary lock event based on a distance between the portable device 200 and a surrounding object sensed by the sensor unit. More particularly, the portable device 200 in a normal camera mode may determine that a temporary lock event is detected when a distance between the portable device 200 and a surrounding object sensed by the sensor unit is kept below a predetermined distance for a second time, and may determine that a temporary lock event is not detected when the distance is not kept below the predetermined distance. That is, when the distance between the portable device 200 and the surrounding object is kept very short for a specific time in a normal camera mode (for example, when the portable device 200 is placed on a table for the second time), the portable device 200 may determine that a temporary lock event is detected. Here, the second time and the predetermined distance may be set by the user, or may be set upon the fabrication of the portable device 200. The above described first time and second time may be equal to or different from each other.

In another example, a temporary lock event may be an event to keep the portable device 200 stationary. The portable device 200 in a normal camera mode may further activate a sensor unit (e.g., a motion sensor, an accelerometer unit, or a gradient sensor). More particularly, the portable device 200 in a normal camera mode may detect a temporary lock event based on variation of an image captured by a camera unit or variation of movement of the portable device 200 sensed by a sensor unit. More particularly, the portable device 200 in a normal camera mode may determine that a temporary lock event is detected when there is no substantial image variation for a third time or there is no substantial movement variation for the third time. The portable device 200 in a normal camera mode may determine that a temporary lock event is not detected when there is substantial image variation or substantial movement variation. That is, when substantial movement of the portable device 200 is not detected for a specific time in a normal camera mode, the portable device 200 may determine that a temporary lock event is detected. Here, the third time may be set by the user, or may be set upon the fabrication of the portable device 200. The above described third time may be equal to the first time and the second time, or may be different from each other.

Naturally, the aforementioned events are given as one embodiment of the temporary lock event, and the portable device 200 of the present specification is not limited by the embodiment. In addition, the portable device 200 in a normal camera mode may determine that a temporary lock event is detected when two or more of the aforementioned events are detected. For example, the portable device 200 in a normal camera mode may determine that a temporary lock event is detected upon detection of the event to block light to an activated camera unit and the event to keep the portable device 200 stationary.

As exemplarily shown at the right upper end of FIGS. 4A and 4B, when a temporary lock event is detected in a normal camera mode, the portable device 200 may activate a temporary standby mode. The portable device 200 in the temporary standby mode may further activate a function to release the temporary standby mode, in addition to a function activated by the portable device 200 in a normal standby mode, and may inactivate at least one function of the portable device 200.

The portable device 200 may detect a first temporary unlock event in a temporary standby mode. More particularly, the portable device 200 may continuously activate a function to detect a first temporary unlock event even in a temporary standby mode, and may detect a first temporary unlock event using the activated function.

Here, the first temporary unlock event may mean an event to release a temporary standby mode and to activate a temporary camera mode of a camera application. In this case, the first temporary unlock event may be an event opposite to the temporary lock event.

In accordance with one embodiment of the present specification, when a temporary lock event is an event to block light to an activated camera unit, a first temporary unlock event may be an event to release blocking of light to the activated camera unit. That is, when a temporary lock event is an event to block light to an activated rear camera unit by the user hand 40 as exemplarily shown at the right upper end of FIG. 4A, a first temporary unlock event may be an event to release blocking of light to the activated rear camera unit by the user hand 40 as exemplarily shown at the right lower end of FIG. 4A. In addition, when a temporary lock event is an event to block light to an activated front camera unit by the user finger 50 as exemplarily shown at the right upper end of FIG. 4B, a first temporary unlock event may be an event to release blocking of light to the activated front camera unit by the user finger 50 as exemplarily shown at the right lower end of FIG. 4B.

In this case, the portable device 200 may activate a camera unit even in a temporary standby mode, and detect a first temporary unlock event based on results sensed by the camera unit. For example, the portable device 200 in a temporary standby mode may detect a first temporary unlock event based on the illuminance of light sensed by an activated camera unit. More particularly, the portable device 200 in a temporary standby mode may determine that a first temporary unlock event is detected when the illuminance of light sensed by an activated camera unit is a predetermined illuminance or more, and may determine that a first temporary unlock event is not detected when the illuminance of light is below the predetermined illuminance. That is, when blocking of light to an activated camera unit is released in a temporary standby mode, the portable device 200 may determine that a first temporary unlock event is detected. Here, the predetermined illuminance may be set by the user, or may be set upon the fabrication of the portable device 200. The aforementioned predetermined illuminance to detect a temporary lock event and the aforementioned predetermined illuminance to detect a first temporary unlock event even may be equal to each other.

In another embodiment of the present specification, when a temporary lock event is an event to keep a distance between the portable device 200 and a surrounding object below a predetermined distance, a first temporary unlock event may be an event to increase the distance between the portable device 200 and the surrounding object beyond the predetermined distance.

In this case, the portable device 200 may further activate a sensor unit (e.g., a proximity sensor unit) even in a temporary standby mode, and detect a first temporary unlock event based on results sensed by the sensor unit. More particularly, the portable device 200 in a temporary standby mode may determine that a first temporary unlock event is detected when a distance between the portable device 200 and a surrounding object sensed by the sensor unit is a predetermined distance or more, and may determine that a first temporary unlock event is not detected when the distance is below the predetermined distance. That is, when the distance between the portable device 200 and the surrounding object is increased in a temporary standby mode (for example, when the user lifts the portable device 200 from a table), the portable device 200 may determine that a first temporary unlock event is detected. Here, the predetermined distance may be set by the user, or may be set upon the fabrication of the portable device 200. The aforementioned predetermined distance to detect a temporary lock event and the aforementioned predetermined distance to detect a first temporary unlock event may be equal to each other.

In accordance with another embodiment of the present specification, when a temporary lock event is an event to keep the portable device 200 stationary, a first temporary unlock event may be an event to move the portable device 200.

In this case, the portable device 200 may activate a camera unit and a sensor unit (for example, an accelerometer unit) even in a temporary standby mode. The portable device 200 in the temporary standby mode may detect a first temporary unlock event based on at least one of variation of an image captured by the camera unit or variation of movement of the portable device 200 sensed by the sensor unit. More specifically, the portable device 200 in a temporary standby mode may determine that a first temporary unlock event is detected when substantial image variation is detected, or substantial movement variation is detected. The portable device 200 in the temporary standby mode may determine that a first temporary unlock event is not detected when substantial image variation or substantial movement variation is not detected. That is, the portable device 200 in a temporary standby mode may determine that a first temporary unlock event is detected upon detection of substantial movement variation.

Naturally, the above described events are given as one embodiment of the first temporary unlock event, and the portable device 200 of the present specification is not limited by the embodiment. In addition, the portable device 200 in a temporary standby mode may determine that a first temporary unlock event is detected when two or more of the aforementioned events are detected. For example, the portable device 200 in a temporary standby mode may determine that a first temporary unlock event is detected upon detection of the event to release blocking of light to an activated camera unit and the event to move the portable device 200.

As exemplarily shown at the right lower end of FIGS. 4A and 4B, when a first temporary unlock event is detected in a temporary standby mode, the portable device 200 may release the temporary standby mode, and activate a temporary camera mode of a camera application.

The portable device 200 in a temporary camera mode may display an execution screen of the temporary camera mode on the display unit 230. In addition, the portable device 200 in a temporary camera mode may store a captured second image in a second folder. Here, the second folder may be a temporary picture folder.

In addition, the portable device 200 in a temporary standby mode may activate a timer function. Thereby, the portable device 200 may determine whether or not a first temporary unlock event is detected within a first time in the temporary standby mode. When the first temporary unlock event is detected within the first threshold time in the temporary standby mode, the portable device 200 may release the temporary standby mode, and activate a temporary camera mode. When the first temporary unlock event is not detected within the first threshold time in the temporary standby mode, the portable device 200 may release the temporary standby mode, and activate a normal standby mode. Here, the first threshold time may be set by the user, or may be set upon the fabrication of the device.

Figure 5:
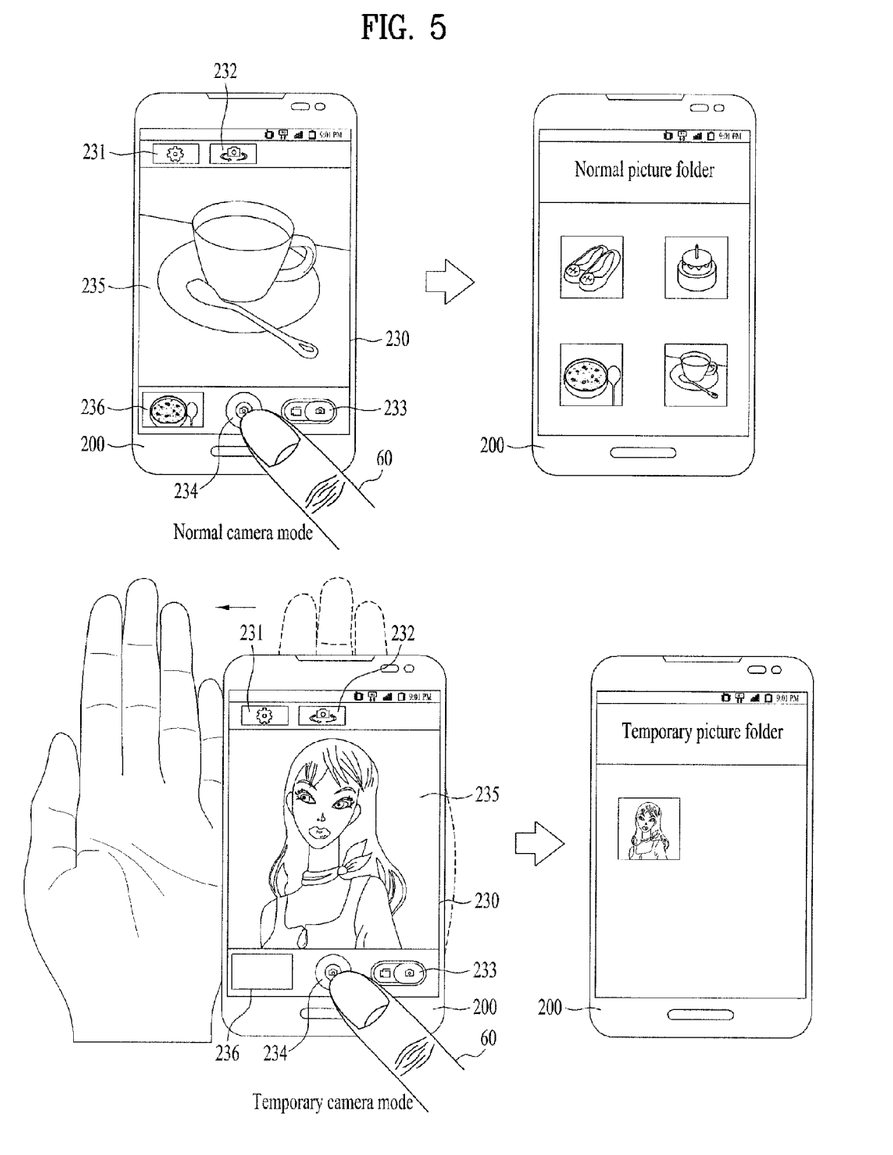
FIG. 5 shows the portable device in which a normal camera mode and a temporary camera mode of a camera application are activated in accordance with one embodiment of the present specification.

FIG. 5 shows a portable device in which a normal camera mode and a temporary camera mode of a camera application are activated in accordance with one embodiment of the present specification. More particularly, two figures at the upper end of FIG. 5 show a portable device in which a normal camera mode of a camera application is activated, and two figures at the lower end of FIG. 5 shows a portable device in which a temporary camera mode of a camera application is activated.

Referring to the left upper end of FIG. 5, the portable device 200 in a normal camera mode may activate a normal function of a camera application, and display an execution screen of the camera application on the display unit 230. For example, as exemplarily shown, the portable device 200 in a normal camera mode may display an execution screen of a camera application including a camera setting button 231, a camera rotation button 232, a video switching button 233, an image capture button 234, a preview image 235, and a previously captured image 236. Thereby, the portable device 200 in the normal camera mode may execute a camera setting function, a camera rotation function, a video switching function, an image capture function, a preview image display function, and a previously captured image display function.

The portable device 200 in a normal camera mode may capture an image of a surrounding object via a camera unit when a user input 60 to the image capture button 234 is detected. For example, when a rear camera unit is activated, the portable device 200 in a normal camera mode may capture a surrounding object located in the rear direction of the portable device 200 via the rear camera unit when the user input 60 to the image capture button 234 is detected. In another example, when a front camera unit is activated, the portable device 200 in a normal camera mode may capture a surrounding object located in the front direction of the portable device 200 via the front camera unit when the user input 60 to the image capture button 234 is detected. Here, the front face of the portable device 200 may mean a face at which a display unit is installed, and the rear face of the portable device 200 may mean a face opposite to the front face.

Referring to the right upper end of FIG. 5, the portable device 200 in a normal camera mode may store a captured first image in a first folder. Here, the first folder may be a normal picture folder. As exemplarily shown, the normal picture folder may further store at least one image previously captured in the normal camera mode, in addition to the first image.

Referring to the left lower end of FIG. 5, the portable device 200 in a temporary camera mode may inactivate at least one of functions activated in a normal camera mode.

For example, as exemplarily shown, the portable device 200 in a temporary camera mode may display the camera setting button 231, the camera rotation button 232, the video switching button 233, the image capture button 234, and the preview image 235 on the display unit 230, and may not display the previously captured image 236 that is displayed on the execution screen of the normal camera mode. That is, the portable device 200 in a temporary camera mode may inactivate a function to display a previously captured image on an execution screen, differently from that in the normal camera mode.

In another example, the portable device 200 in a temporary camera mode may activate a function to display a previously captured image on an execution screen, but may inactivate a function to display an image captured in a normal camera mode during execution of the previously captured image display function. That is, the portable device 200 in a temporary camera mode may display only a previous image captured in a temporary camera mode during execution of the previously captured image display function. In addition, the portable device 200 may access a normal picture folder when a user input to a previously captured image is detected in a normal camera mode, but may access a temporary picture folder when a user input to a previously captured image is detected in a temporary camera mode.

In a further example, the portable device 200 in a temporary camera mode may inactivate a function to access a normal picture folder, to which the portable device 200 may access in a normal camera mode. That is, user access to both a normal picture folder and a temporary picture folder is possible while the portable device 200 is in a normal camera mode, whereas user access to only a temporary picture folder is possible while the portable device 200 is in a temporary camera mode.

The portable device 200 in a temporary camera mode may capture an image of a surrounding object via a camera unit when the user input 70 to the image capture button 234 is detected. This is equal to the above description related to a normal camera mode.

Referring to the right lower end of FIG. 5, the portable device 200 in a temporary camera mode may store a captured second image in a second folder. Here, the second folder may be a temporary picture folder. Here, a normal picture folder for a normal camera mode and a temporary picture folder for a temporary camera mode may be different. In addition, a normal picture folder for a normal camera mode and a temporary picture folder for a temporary camera mode may be sub folders included in the same photo gallery.

In addition, the portable device 200 may automatically delete the second image stored in the temporary picture folder when the temporary camera mode ends. On the other hand, when it is desired to continuously possess a picture captured in a temporary camera mode, the user may transmit the second image stored in the temporary picture folder to other devices or servers via a transmission application before the temporary camera mode ends.

Figure 6:
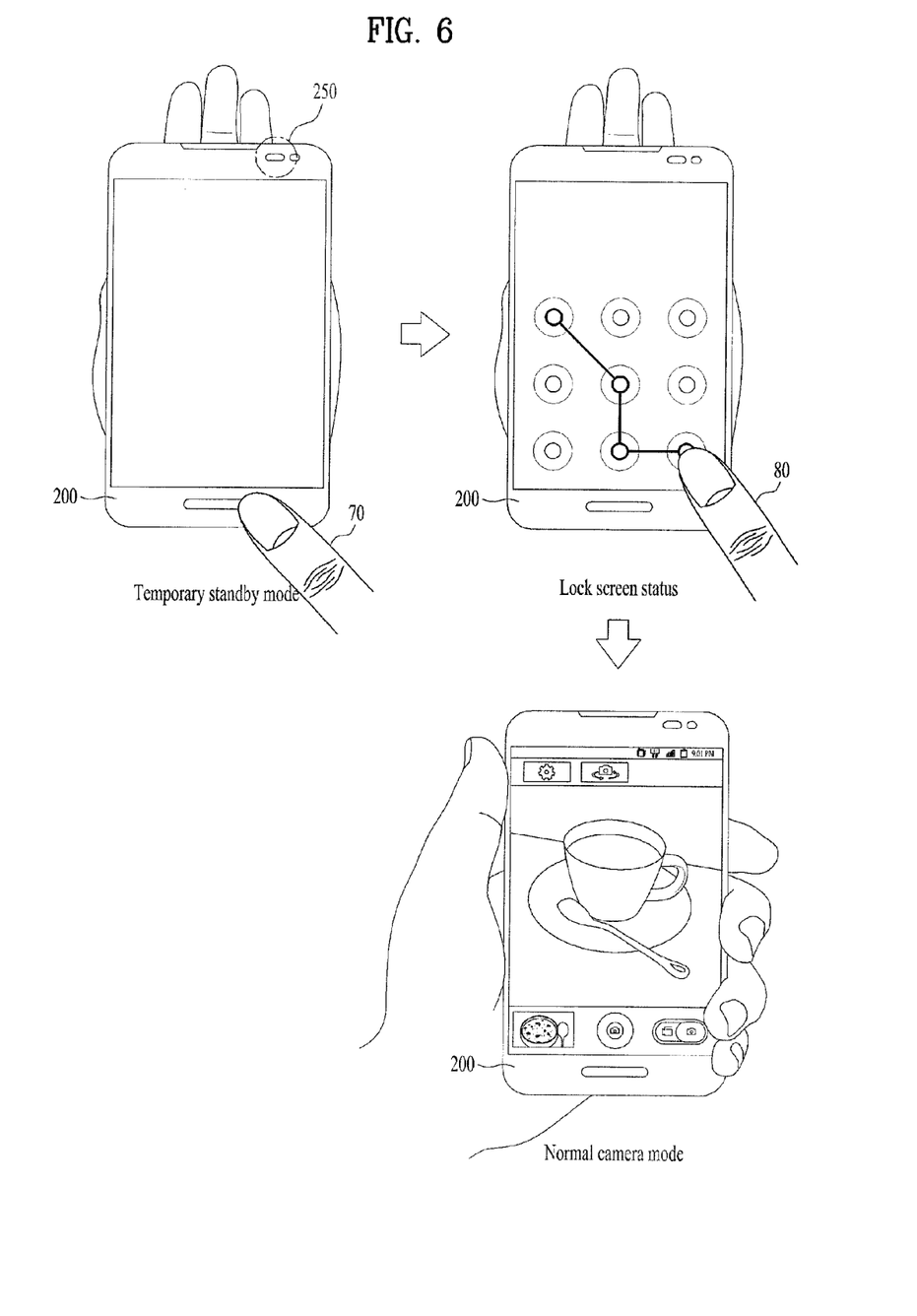
FIG. 6 shows a method of releasing a temporary standby mode of the portable device and activating the portable device in accordance with one embodiment of the present specification.

FIG. 6 shows a method of releasing a temporary standby mode of a portable device and activating the portable device in accordance with one embodiment of the present specification.

As exemplarily shown at the left upper end of FIG. 6, the portable device 200 in a temporary standby mode may provide an indicator informing the user of the temporary standby mode of the portable device 200. In this case, the indicator may include the lighting unit 250 of the portable device 200 to visually inform the user of the temporary standby mode.

In addition, the portable device 200 in a temporary standby mode may detect a first temporary unlock event or a second temporary unlock event. Here, the first temporary unlock event is equal to the above description with reference to FIG. 4, and thus a detailed description thereof will be omitted hereinafter.

Here, the second temporary unlock event may mean an event to release a temporary standby mode and to activate the portable device 200. In this case, the second temporary unlock event may be equal to a normal unlock event. For example, the second temporary unlock event may be at least one of a power button press event, a power button release event, a home button press event, and a home button release event. Naturally, the above described events are given as one embodiment of the second temporary unlock event, and the portable device 200 of the present specification is not limited by the embodiment.

In addition, the portable device 200 in the temporary standby mode may release the temporary standby mode when the second temporary unlock event is detected by a user input 70, and activate a lock screen thereof.

As exemplarily shown at the right upper end of FIG. 6, when the portable device 200 has security settings, the portable device 200 under a lock screen status may display an unlock interface on a lock screen. When the portable device 200 has security settings, the portable device 200 under a lock screen status may detect a user input 80 to implement user authentication corresponding to the unlock user interface so as to unlock the lock screen. The portable device 200 may unlock the lock screen by successfully implementing user authentication upon detection of the user input 80.

As exemplarily shown at the right lower end of FIG. 6, the portable device 200, unlocked from the lock screen, may activate a normal camera mode of a camera application, and display an execution screen of the normal camera mode. That is, when a second temporary unlock event is detected after switching from a normal camera mode to a temporary standby mode, the portable device 200 may release the temporary standby mode, and again activate the normal camera mode, rather than activating a home screen. This is in contrast to the case in which the portable device 100 releases a temporary standby mode and activates a temporary camera mode when a first temporary unlock event is detected after switching from a normal camera mode to the temporary standby mode.

Figure 7:
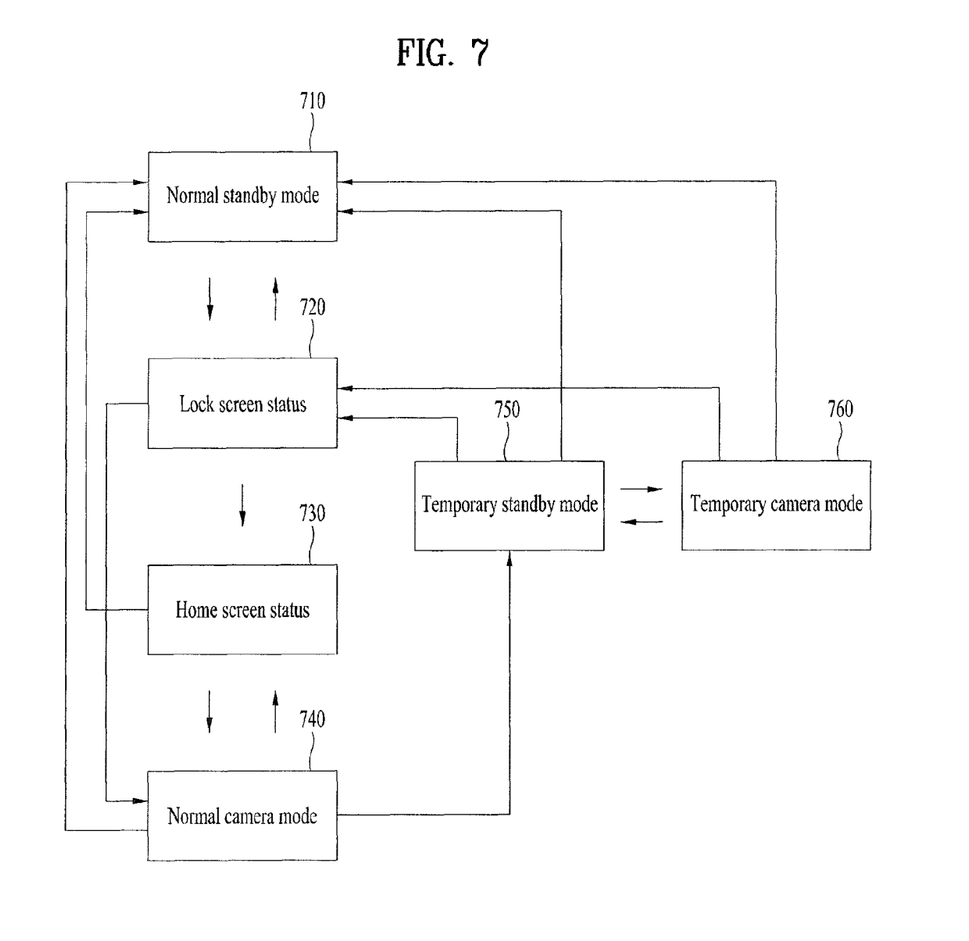
FIG. 7 is a view showing operation of a portable device in accordance with one embodiment of the present specification.

FIG. 7 is a view showing operation of a portable device in accordance with one embodiment of the present specification. In FIG. 7, a detailed description related to parts similar or equal to those of the above description with reference to FIGS. 1 to 6 will be omitted hereinafter.

Referring to FIG. 7, the portable device may be in a normal standby mode 710. The portable device may be switched from a lock screen status 720, a home screen status 730, a normal camera mode 740, a temporary standby mode 750, or a temporary camera mode 760 to the normal standby mode 710 upon detection of a normal lock event. The portable device in the normal standby mode 710 may inactivate functions of a display unit and a camera unit in order to save power of the device. In addition, the portable device in the normal standby mode 710 may activate a function to detect a normal unlock event.

In addition, when the portable device detects a normal unlock event in the normal standby mode 710, the portable device may release the normal standby mode 710, and be switched to the lock screen status 720. Naturally, based on settings, the portable device may release the normal standby mode 710 and be directly switched to the home screen status 730 rather than the lock screen status 720.

The portable device under the lock screen status 720 may activate a display unit, and display a lock screen on the display unit. Then, the portable device under the lock screen status 720 may display an unlock user interface on the lock screen based on security settings. In addition, the portable device under the lock screen status 720 may display a quick camera icon on the lock screen based on settings.

The portable device under the lock screen status 720 may activate a function to detect a first user input that releases a lock screen, a second user input that releases a lock screen by implementing user authentication corresponding to an unlock user interface, or a third user input to a quick camera icon that releases a lock screen and executes a normal camera mode of a camera application, and then detect the first user input, the second user input, or the third user input.

Then, when the portable device detects the first user input or the second user input in the lock screen status 720, the portable device may release the lock screen, and be switched to the home screen status 730.

The portable device under the home screen status 730 may display an icon corresponding to an application installed in the portable device. For example, the portable device under the home screen status 730 may display a camera icon corresponding to a camera application. The portable device under the home screen status 730 may activate a function to detect a user input for selection of a displayed icon, and detect the user input to the icon. For example, the portable device under the home screen status 730 may detect a user input to a camera icon.

Then, when the portable device detects the user input to the camera icon in the home screen status 730, the portable device may be switched to the normal camera mode 740 of the camera application. More particularly, when the portable device detects the third user input in the lock screen status 720, the portable device may release the lock screen and be switched to the normal camera mode 740 of the camera application. In addition, when the portable device includes a mechanical quick camera button, the portable device may further activate a quick camera button function in the normal standby mode 710, the lock screen status 720, or the home screen status 730, and then be directly switched to the normal camera mode 740 of the camera application upon detection of a quick camera button press or release event.

The portable device in the normal camera mode 740 may activate a normal function of the camera application. The portable device in the normal camera mode 740 may store a captured first image in a first folder. Here, the first folder may be a normal picture folder. The portable device in the normal camera mode 740 may activate a function to detect a temporary lock event.

Then, when the portable device detects a temporary lock event in the normal camera mode 740, the portable device may be switched from the normal camera mode 740 to the temporary standby mode 750. In addition, when the portable device detects a temporary lock event in the temporary camera mode 760, the portable device may be switched from the temporary camera mode 760 to the temporary standby mode 750.

The portable device may be in the temporary standby mode 750, in order to activate the temporary camera mode 760 of the camera application. The portable device in the temporary standby mode 750 may inactivate a display unit to save power of the device. The portable device in the temporary standby mode 750 may further activate a function to release the temporary standby mode 750, in addition to a function activated by the portable device in the normal standby mode 710. For example, the portable device in the temporary standby mode 750 may further activate at least one of a camera unit and a sensor unit to detect a first temporary unlock event that releases the temporary standby mode 750 and activates the temporary camera mode 760.

The portable device in the temporary standby mode 750 may activate a timer function. For example, the portable device may begin to activate a timer when switched to the temporary standby mode 750, and may be switched from the temporary standby mode 750 to the normal standby mode 710 when a first temporary unlock event is not detected for a predetermined time.

When the portable device detects a first temporary unlock event in the temporary standby mode 750, the portable device may be released from a temporary standby condition and be switched from the temporary standby mode 750 to the temporary camera mode 760 of the camera application. In addition, when the portable device detects a second temporary unlock event to release a temporary standby condition and activate the portable device in the temporary standby mode 750, the portable device may be switched from the temporary standby mode 750 to the lock screen status 720.

The portable device in the temporary camera mode 760 may inactivate at least one function activated in the normal camera mode 740 of the camera application. In addition, the portable device in the temporary camera mode 760 may store a captured second image in a second folder. Here, the second folder may be a temporary picture folder.

When the portable device detects a home screen activation event in the normal camera mode 740, the portable device may be switched from the normal camera mode 740 to the home screen status 730. In addition, when the portable device detects a home screen activation event in the temporary camera mode 760, the portable device may activate a lock screen status prior to activating a home screen status. Here, the home screen activation event may be a home button press event or a home button release event, but is not limited thereto.

As described above, in accordance with one embodiment of the present specification, entering the temporary camera mode 760 is possible only through the temporary standby mode 750, and entering the temporary standby mode 750 is possible only through the normal camera mode 740 or the temporary camera mode 760. In this way, the portable device may provide the user with a temporary camera mode as a guest mode different from a normal camera mode of a camera application.

FIG. 7 is a view showing operation of the portable device in accordance with one embodiment of the present specification, and some of the aforementioned modes and conditions may be omitted or combined based on settings. It will be appreciated that all of the aforementioned modes and conditions shown in FIG. 7 are required to implement the embodiments of the present specification.

Figure 8:
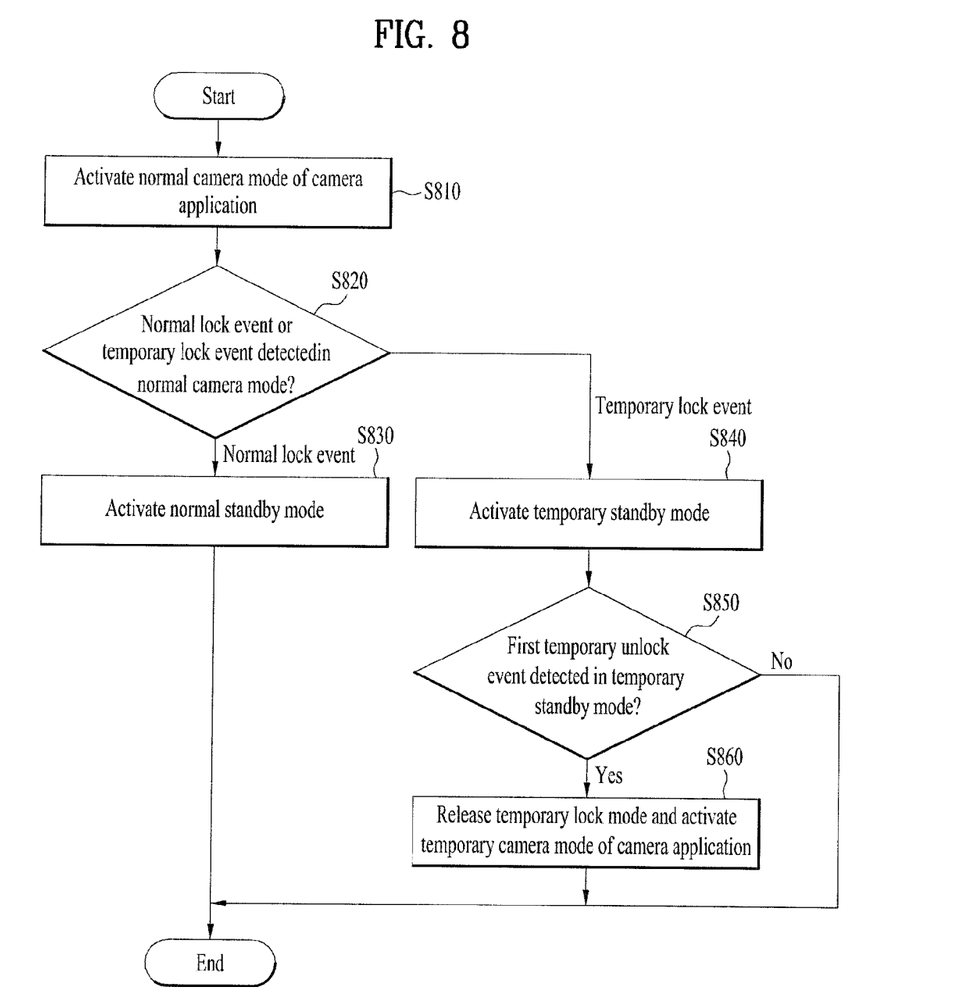
FIG. 8 is a flowchart of a control method of a portable device in accordance with one embodiment of the present specification.

FIG. 8 is a flowchart of a control method of a portable device in accordance with one embodiment of the present specification. With regard to the flowchart, a detailed description of parts similar to or equal to those of the above description with reference to FIGS. 1 to 7 will be omitted hereinafter.

Referring to FIG. 8, the portable device may activate a normal camera mode of a camera application (S810). Here, the normal camera mode may mean a mode that is normally activated upon execution of the camera application. The portable device may store a first image captured in the normal camera mode in a first folder. The first folder may be a normal picture folder.

The portable device may activate the normal camera mode of the camera application upon detecting a user input to a camera icon displayed on a home screen. In addition, the portable device may activate the normal camera mode of the camera application upon detecting a user input to a camera icon displayed on a lock screen. In addition, the portable device may activate a mechanical quick camera button function in a normal standby mode, a home screen status, or a lock screen status, and activate the normal camera mode of the camera application upon detecting a user input to the mechanical quick camera button.

Next, the portable device in the normal camera mode may detect a normal lock event thereof, or a temporary lock event thereof (S820). Here, the normal lock event may be an event to activate a normal standby mode of the portable device. For example, the normal lock event may be a power button press event or a power button release event.

Here, the temporary lock event may be an event to activate a temporary standby mode. For example, the temporary lock event may be an event to block light to an activated camera unit. The portable device in the normal camera mode may detect the temporary lock event based on results sensed by the activated camera unit. For example, the portable device in the normal camera mode may detect the temporary lock event based on the illuminance of light sensed by the activated camera unit.

Next, when the normal lock event is detected in the normal camera mode, the portable device may activate a normal standby mode (S830). The normal standby mode may mean a mode to save power of the device, and the portable device may be normally kept in the standby mode. The portable device in the normal standby mode may inactivate at least one function thereof except for a function to detect a normal unlock event that releases the normal standby mode and activates the portable device. For example, the portable device in the normal standby mode may activate a power button function or a home button function to detect a normal unlock event, and may inactivate the camera unit and a display unit. Thereby, the portable device may reduce consumption of standby power.

Next, when the temporary lock event is detected in the normal camera mode, the portable device may activate a temporary standby mode (S840). The temporary standby mode may mean a mode to save power of the device, and the portable device may be kept in the temporary standby mode in order to activate a temporary camera mode of the camera application. The portable device in the temporary standby mode may further activate a function to detect a first temporary unlock event that releases the temporary standby mode and activates a temporary camera mode of the camera application, in addition to a function activated by the portable device in the normal standby mode. For example, the portable device in the temporary standby mode may further activate at least one of the camera unit and a sensor unit to detect a first temporary unlock event, in addition to activating a power button function or a home button function, and may inactivate the display unit. Thereby, the portable device may reduce consumption of standby power, and may be kept so as to enter a temporary camera mode as needed.

Next, the portable device in the temporary standby mode may detect a first temporary unlock event (S850). Here, the first temporary unlock event may be an event to release the temporary standby mode and to activate a temporary camera mode of the camera application. The first temporary unlock event may be an event opposite to the temporary lock event. For example, the first temporary unlock event may be an event to release blocking of light to the activated camera unit. The portable device in the temporary standby mode may activate the camera unit, and detect a temporary lock event based on results sensed by the activated camera unit. For example, the portable device in the temporary standby mode may detect a temporary lock event based on the illuminance of light sensed by the activated camera unit.

Next, when the first temporary unlock event is detected in the temporary standby mode, the portable device may release the temporary standby mode, and activate a temporary camera mode of the camera application (S860). The temporary camera mode may mean a mode temporarily activated upon execution of the camera application simultaneously with release of the temporary standby mode. In this case, the temporary camera mode may be a guest mode of the camera application. The portable device may store a second image captured in the temporary camera mode in a second folder. In this case, the second folder may be a temporary picture folder.

In the present specification, entering the normal camera mode is possible through a home screen status and the like, whereas entering the temporary camera mode is possible only through the temporary standby mode. In addition, in the present specification, the first folder, in which the first image captured in the normal camera mode is stored, may be different from the second folder, in which the second image captured in the temporary camera mode is stored. In addition, in the present specification, entering both the first folder and the second folder is possible in an activated state of the normal camera mode, whereas entering only the second folder is possible in an activated state of the temporary camera mode. That is, the user may view only the second image stored in the second folder in an activated state of the temporary camera mode.

As is apparent from the above description, according to the present specification, a portable device may provide a normal standby mode and a temporary standby mode, and may activate a normal camera mode and a temporary camera mode of a camera application.

Further, according to the present specification, the portable device may activate the temporary standby mode upon detecting a temporary lock event in the normal camera mode of the camera application, and may release the temporary standby mode and activate the temporary camera mode of the camera application upon detecting a temporary unlock event in the temporary standby mode. Thereby, the user may easily activate the temporary camera mode even during execution of the normal camera mode.

Furthermore, according to the present specification, the portable device may store an image captured in the normal camera mode and an image captured in the temporary camera mode in different folders.

In addition, according to the present specification, entering the folder in which the image captured in the normal camera mode is stored and the folder in which the image captured in the temporary camera mode is stored is possible in the normal camera mode of the camera application, whereas entering only the folder in which the image captured in the temporary camera mode is stored is possible in the temporary camera mode of the camera application. Thereby, the user may tighten security the image captured in the normal camera mode against guests.

It will be apparent to those skilled in the art that various modifications and variations can be made in the present specification without departing from the spirit or scope of the present specification. Thus, it is intended that the present specification covers the modifications and variations of this specification provided they come within the scope of the appended claims and their equivalents.

A portable device and a control method thereof in accordance with the present specification may be implemented as code that may be written on a processor readable recording medium and thus read by a processor provided in a network device. The processor readable recording medium may be any type of recording device in which data is stored in a processor readable manner. Examples of the processor readable recording medium may include a ROM, a RAM, a CD-ROM, a magnetic tape, a floppy disc, and an optical data storage device. In addition, the processor readable recording medium includes a carrier wave (e.g., data transmission over the Internet). Also, the processor readable recording medium may be distributed over a plurality of computer systems connected to a network so that processor readable code is written thereto and executed therefrom in a decentralized manner.

Further, in the present specification, an angle, a distance, and a direction may be understood as not only referring to accurate values, but as also including a substantial angle, a substantial distance, and a substantial direction within a given range. That is, an angle, a distance, and a direction of the present specification may refer to a substantial angle, a substantial distance, and a substantial direction, and a given tolerance may be present therebetween.

Furthermore, in the present specification, both a device invention and a method invention have been described, and explanations of both inventions may be applied complementally as necessary.

What is claimed is:

1. A portable device comprising:
a camera unit configured to sense a surrounding image of the portable device;
a sensor unit configured to sense at least one of surrounding environment of the portable device and a user input;
a display unit configured to display an execution screen of a camera application, the camera application providing a normal camera mode and a temporary camera mode; and
a processor configured to control the camera unit, the sensor unit, and the display unit,
wherein the processor is further configured to:
activate the normal camera mode of the camera application, wherein a first image captured in the normal image capture mode is stored in a first folder, activate a normal standby mode of the portable device when a normal lock event is detected in the normal camera mode, activate a temporary standby mode of the portable device when a temporary lock event is detected in the normal camera mode, and when a first temporary unlock event is detected in the temporary standby mode, release the temporary standby mode and activate the temporary camera mode of the camera application, wherein a second image captured in the temporary camera mode is stored in a second folder, wherein the second folder is different from the first folder.

2. The portable device according to claim 1, wherein the temporary standby mode is a mode in which a function to release the temporary standby mode is further activated, in addition to a function activated in the normal standby mode.

3. The portable device according to claim 1, wherein, when the normal standby mode is activated, the processor is configured to inactivate the display unit and the camera unit.

4. The portable device according to claim 1, wherein, when the temporary standby mode is activated, the processor is configured to inactivate the display unit and activate at least one of the camera unit and the sensor unit.

5. The portable device according to claim 1, wherein the processor is configured to detect the temporary lock event or the first temporary unlock event based on at least one of sensing results of the camera unit and sensing results of the sensor unit.

6. The portable device according to claim 1, wherein the processor is configured to detect the temporary lock event or the first temporary unlock event based on the illuminance of light sensed by the camera unit.

7. The portable device according to claim 1, wherein the processor is configured to detect the temporary lock event or the first temporary unlock event based on a distance between the portable device and a surrounding object, sensed by the sensor unit.

8. The portable device according to claim 1, wherein the processor is further configured to provide an indicator informing a user of the temporary standby mode when the temporary standby mode is activated.

9. The portable device according to claim 8, wherein the indicator informs the user of the temporary standby mode using at least one lighting unit included in the portable device.

10. The portable device according to claim 1, wherein the processor is further configured to:
when the first temporary unlock event is detected within a first threshold time in the temporary standby mode, release the temporary standby mode and activate the temporary camera mode, and
when the first temporary unlock event is not detected within the first threshold time in the temporary standby mode, release the temporary standby mode and activate the normal standby mode.

11. The portable device according to claim 1, wherein, when a normal unlock event is detected in the normal standby mode, the processor is configured to release the normal standby mode and activate a lock screen status or a home screen status.

12. The portable device according to claim 1, wherein the temporary lock event is an event blocking light to the camera unit, and
wherein the first temporary unlock event is an event releasing blocking of light to the camera unit.

13. The portable device according to claim 11, wherein the normal lock event is a power button press event or a power button release event, and
wherein the normal unlock event is at least one of a power button press event, a power button release event, a home button press event, and a home button release event.

14. The portable device according to claim 1, wherein, when a second temporary unlock event is detected in the temporary standby mode, the processor is configured to release the temporary standby mode and activate a lock screen status.

15. The portable device according to claim 14, wherein the second temporary unlock event is equal to the normal unlock event.

16. The portable device according to claim 14, wherein, when a user input to release the lock screen is detected in the lock screen status, the processor is configured to release the lock screen status and reactivate the normal camera mode of the camera application.

17. The portable device according to claim 1, wherein, when the temporary camera mode is activated, the processor is configured to inactivate at least one function of the camera application activated in the normal camera mode.

18. The portable device according to claim 1, wherein, when the temporary lock event is detected in the temporary camera mode, the processor is configured to activate the temporary standby mode.

19. The portable device according to claim 1, wherein the first folder is a normal picture folder and the second folder is a temporary picture folder.

20. A control method of a portable device, the method comprising:
activating a normal camera mode of a camera application, wherein a first image captured in the normal camera mode is stored in a first folder;
activating a normal standby mode of the portable device when a normal lock event is detected in the normal camera mode;
activating a temporary standby mode of the portable device when a temporary lock event is detected in the normal camera mode; and
when a first temporary unlock event is detected in the temporary standby mode of the camera application, releasing the temporary standby mode and activating the temporary camera mode, wherein a second image captured in a temporary camera mode is stored in a second folder,
wherein the second folder is different from the first folder.

* * * * *